(12) United States Patent
Servais

(10) Patent No.: US 11,906,683 B2
(45) Date of Patent: Feb. 20, 2024

(54) DYNAMIC TIME WARPING OF SIGNALS PLUS USER PICKS

(71) Applicant: Landmark Graphics Corporation, Houston, TX (US)

(72) Inventor: Marc Paul Servais, Reading (GB)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 16/954,874

(22) PCT Filed: Dec. 12, 2019

(86) PCT No.: PCT/US2019/065918
§ 371 (c)(1),
(2) Date: Jun. 17, 2020

(87) PCT Pub. No.: WO2021/040769
PCT Pub. Date: Mar. 4, 2021

(65) Prior Publication Data
US 2021/0318462 A1      Oct. 14, 2021

Related U.S. Application Data

(60) Provisional application No. 62/891,782, filed on Aug. 26, 2019, provisional application No. 62/891,780, filed on Aug. 26, 2019.

(51) Int. Cl.
*G01V 11/00* (2006.01)
*E21B 47/12* (2012.01)
(Continued)

(52) U.S. Cl.
CPC ............ *G01V 11/002* (2013.01); *E21B 47/12* (2013.01); *E21B 49/00* (2013.01); *G01V 1/48* (2013.01); *G01V 3/38* (2013.01)

(58) Field of Classification Search
CPC .......... G01V 11/002; G01V 1/48; G01V 3/38; E21B 47/12; E21B 49/00
See application file for complete search history.

(56) References Cited

U.S. PATENT DOCUMENTS 10,042,081 B2   8/2018   Benson et al.
10,459,098 B2   10/2019  Grant et al.
(Continued)

FOREIGN PATENT DOCUMENTS

BR      PI0616231 A2 *   2/2013
JP      20030146794 A    5/2003
(Continued)

OTHER PUBLICATIONS

Office Action dated Aug. 23, 2021 (13 pages), U.S. Appl. No. 16/954,880, filed Jun. 17, 2020.
(Continued)

*Primary Examiner* — Yoshihisa Ishizuka
(74) *Attorney, Agent, or Firm* — Conley Rose, P.C.; Rodney B. Carroll

(57) ABSTRACT

A method for correlating data comprises acquiring a first sequence signal and a second sequence signal, wherein the first sequence signal comprises at least a first data point including a first set of components and the second sequence signal comprises at least a second data point including a second set of components; acquiring a first set of user picks and a second set of user picks, wherein the first and the second sets of user picks each contain a respective first and second correspondence between a component in the first set of components and a component in the second set of components; combining the first and second sets of user picks with the first and second sequence signals to create a first hyper-complex signal and a second hyper-complex
(Continued)

signal; and performing signal alignment on the first and second hyper-complex signals.

20 Claims, 7 Drawing Sheets

(51) Int. Cl.
    *G01V 1/48*     (2006.01)
    *G01V 3/38*     (2006.01)
    *E21B 49/00*     (2006.01)

(56) References Cited

U.S. PATENT DOCUMENTS

| | | | |
|---|---|---|---|
| 10,753,202 B2 | 8/2020 | Spencer Elkington et al. | |
| 2006/0077757 A1* | 4/2006 | Cox | G01V 1/40 367/25 |
| 2014/0301165 A1* | 10/2014 | Nichols | G01V 1/303 367/52 |
| 2014/0316706 A1 | 10/2014 | Grant et al. | |
| 2015/0088424 A1 | 3/2015 | Burlakov et al. | |
| 2016/0327678 A1 | 11/2016 | Benson et al. | |
| 2016/0334542 A1 | 11/2016 | Chiu et al. | |
| 2017/0123097 A1* | 5/2017 | Fang | G01V 3/38 |
| 2018/0112522 A1 | 4/2018 | Androvandi et al. | |
| 2018/0225778 A1* | 8/2018 | Grant | G06Q 10/06395 |
| 2019/0383133 A1 | 12/2019 | Pollack et al. | |
| 2021/0102457 A1* | 4/2021 | Dupont | G01V 1/50 |

FOREIGN PATENT DOCUMENTS

| | | |
|---|---|---|
| JP | 2004348594 A | 12/2004 |
| WO | 20180164680 A1 | 9/2018 |
| WO | 2018182691 A1 | 10/2018 |
| WO | WO-2018208634 A1 * 11/2018 | ............. G01V 1/306 |

OTHER PUBLICATIONS

Filing Receipt, Specification and Drawings for U.S. Appl. No. 62/891,780, entitled "Dynamic Time Warping of Signals Plus User Picks," filed Aug. 26, 2019, 37 pages.
Filing Receipt, Specification and Drawings for U.S. Appl. No. 62/891,782, entitled "Performing Dynamic Time Warping With Null or Missing Data," filed Aug. 26, 2019, 37 pages.
Electronic Acknowledgement Receipt, Specification and Drawings for International Application No. PCT/US2019/065918, entitled "Dynamic Time Warping of Signals Plus User Pick," filed Dec. 12, 2019, 38 pages.
Electronic Acknowledgement Receipt, Specification and Drawings for International Application No. PCT/US2019/065920, entitled "Performing Dynamic Time Warping With Null or Missing Data," filed Dec. 12, 2019, 37 pages.
Foreign Communication from Related Application—International Search Report and Written Opinion of the International Searching Authority, International Application No. PCT/US2019/065918, dated May 25, 2020, 11 pages.
Foreign Communication from Related Application—International Search Report and Written Opinion of the International Searching Authority, International Application No. PCT/US2019/065920, dated May 25, 2020, 10 pages.
Edwards, Jonathan et al., "Uncertainty management in stratigraphic well correlation and stratigraphic architectures: A training-based method," Computers and Geosciences, 2018, pp. 1-17, vol. 111, Elsevier Limited.
Kulkarni, Neha, "Effect of Dynamic Time Warping using different Distance Measures on Time Series Classification," International Journal of Computer Applications, 2017, pp. 34-39, vol. 179, No. 6.
Lallier, Florent et al., "Uncertainty assessment in the stratigraphic well correlation of a carbonate ramp: Method and application to the Beausset Basin, SE France," Comptes Rendus Geoscience, 2016, pp. 499-509, vol. 348, Elsevier.
Salvador, Stan et al., "FastDTW: Toward Accurate Dynamic Time Warping in Linear Time and Space," Florida Institute of Technology, 11 pages.
Wheeler, Loralee, "Automatic and Simultaneous Correlation of Multiple Well Logs," Colorado School of Mines, 2015, 48 pages.
Sitaram, Dinkar et al., "A Measure of Similarity of Time Series Containing Missing Data Using the Mahalanobis Distance," 2015 Second International Conference on Advances in Computing and Communication Engineering, pp. 622-627, IEEE Computer Society.

* cited by examiner

| INDEX | 1 | 2 | ... | 127 | 128 | 129 | ... | 295 | 296 | 297 | ... | 967 | 968 | 969 | ... | 1139 | 1140 | 1141 | ... |
|---|---|---|---|---|---|---|---|---|---|---|---|---|---|---|---|---|---|---|---|
| VALUE | NULL | NULL | NULL | NULL | 1 | NULL | NULL | NULL | 2 | NULL | NULL | NULL | 3 | NULL | NULL | NULL | 4 | NULL | NULL |

DYNAMIC TIME WARPING OF SIGNALS PLUS USER PICKS

CROSS-REFERENCE TO RELATED APPLICATIONS

This application is a filing under 35 U.S.C. 371 of International Application No. PCT/US2019/065918 filed Dec. 12, 2019 and entitled "Dynamic Time Warping of Signals Plus User Picks," which claims priority to U.S. Provisional Application No. 62/891,780 filed Aug. 26, 2019 and entitled "Dynamic Time Warping of Signals Plus User Picks," and U.S. Provisional Application No. 62/891,782 filed Aug. 26, 2019 and entitled "Performing Dynamic Time Warping With Null or Missing Data," each of which applications is incorporated by reference herein in its entirety.

BACKGROUND

The present disclosure relates to performing dynamic time warping (DTW) on data sequences with user picks.

Hydrocarbons, such as oil and gas, are commonly obtained from subterranean formations that may be located onshore or offshore. Subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Modern petroleum drilling and production operations demand a great quantity of information relating to downhole parameters and conditions. Such information typically includes characteristics of the earth formations traversed by the wellbore, in addition to data relating to the size and configuration of the borehole itself. Oil well logging is a technique for providing information to a formation evaluation professional or driller regarding the particular earth formation being drilled. The collection of information relating to downhole conditions is commonly referred to as "logging," and can be performed by several methods. These methods may include measurement while drilling (MWD), logging while drilling (LWD), and wireline logging.

MWD is the term generally used for measuring conditions downhole concerning the movement and location of the drilling assembly while the drilling continues, while LWD is the term generally used for similar techniques that concentrate more on formation parameter measurement. To perform oil well wireline logging, a probe or "sonde" is lowered into the borehole after some or all of the well has been drilled, and the probe or sonde is used to determine certain characteristics of the formations traversed by the borehole. The sonde may include one or more sensors to measure parameters downhole and may be constructed as a hermetically sealed cylinder for housing such sensors, which may hang at the end of a long cable or "wireline." Normally, the cable supplies operating power to the sonde and is used as an electrical conductor to transmit information signals from the sonde to the surface. One or more measurement techniques may be used to measure various parameters of the earth's formations and correlate those parameters with the position of the sonde in the borehole as the sonde is pulled uphole.

A chart or plot of an earth parameter or of a logging tool signal versus the position or depth in the borehole is generally referred to as a log or well log. A well log can be a record indicative of the geologic formations that are penetrated by a wellbore. A formation may include a succession of rock strata (e.g., subsurface rock layers), typically along a depth scale, with comparable lithology or other similar properties (e.g., color, fossil content, age, chemical composition, physical properties, etc.). A formation may also refer to a group of rocks within a depth range in a drilled well.

The depth may be the distance from the surface of the earth to the location of the tool in the borehole or may be true depth, which is typically the same only for a perfectly vertical straight borehole. The log of the tool signal or raw data may always not provide a clear representation of the earth parameter that the formation evaluation professional or driller needs to know. Therefore, the tool signal may be processed to produce a log that more clearly represents a desired parameter. A well operator or geologist may then manually review the well log to identify strata or other features of interest in the subterranean formation. For example, the well operator may review multiple well logs in a two-dimensional (2D) cross-sectional view or a three-dimensional (3D) view to identify structures or features of interest.

BRIEF DESCRIPTION OF DRAWINGS

These drawings illustrate certain aspects of certain embodiments of the present disclosure. These drawings should not be used to limit or define the present disclosure.

FIG. 4 illustrates an example representation of a sparse sequence in accordance with embodiments of the disclosure;

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF EMBODIMENTS

Disclosed herein is a robust signal alignment scheme that incorporates user-assigned picks or constraints within two different sequence signals. To this end, the user-assigned picks or constraints may be converted into complex number values and incorporate with real-value components of the two sequence signals, so as to generate two hyper-complex signals containing the real-value components of the original two sequence signals plus imaginary components corresponding to the user-assigned picks or constraints. The disclosed signal alignment scheme allows for performing a single application of dynamic time warping (DTW) on the two hyper-complex signals to obtain a mapping between the two sequence signals that is consistent with the user-assigned picks or constraints. Further, the user-assigned picks or constraints may be given weights according to user reliability, in which case conflicts between the user-assigned picks or constraints may be resolved according to the weights given to each user. Further, the signal alignment scheme and concepts disclosed herein may be extended to a wide range of applications utilizing techniques such as DTW to compare signal sequences having multiple types of samples or components at a particular data point. These and other aspects are described further herein.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. Devices and methods in accordance with certain embodiments may be used in one or more of wireline (including wireline, slickline, and coiled tubing), downhole robot, and drilling operations including MWD and/or LWD.

Figure 1:
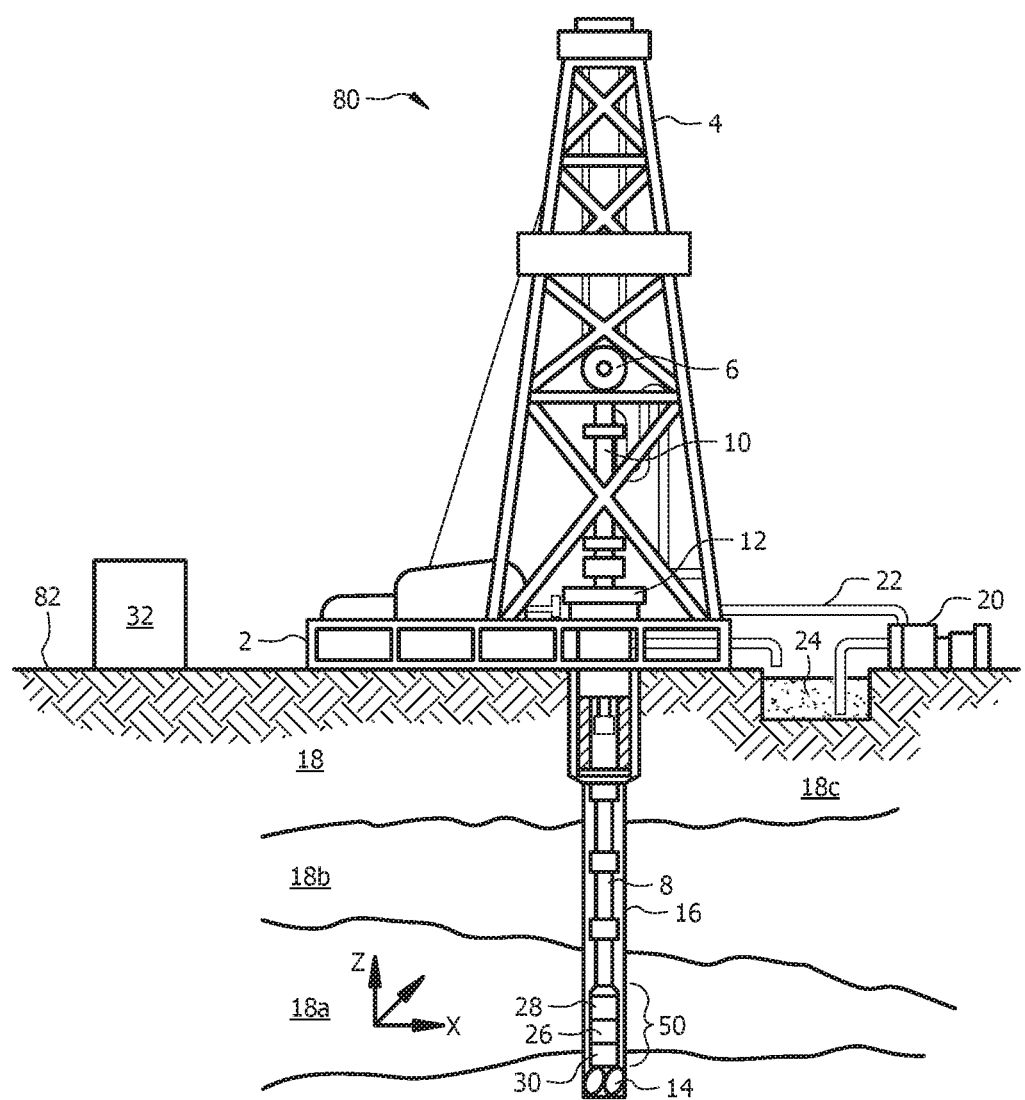
FIG. 1 illustrates an example subterranean drilling system in accordance with embodiments of the present disclosure.

FIG. 1 illustrates an example subterranean drilling system 80, according to aspects of the present disclosure. The drilling system 80 comprises a drilling platform 2 positioned at the surface 82. In the embodiment shown, the surface 82 comprises the top of a formation 18 containing one or more rock strata or layers 18*a-c*, and the drilling platform 2 may be in contact with the surface 82. In other embodiments, such as in an off-shore drilling operation, the surface 82 may be separated from the drilling platform 2 by a volume of water. The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus between drill string 8 and borehole 16, and into a retention pit 24. The drilling fluid lubricates the drill string 8, transports cuttings from the borehole 16 into the pit 24 and aids in maintaining integrity or the borehole 16.

The drilling system 80 may comprise a bottom hole assembly (BHA) 50 coupled to the drill string 8 near the drill bit 14. The BHA 50 may comprise different combinations of drill collars; subs such as stabilizers, reamers, shocks, hole-openers; and various downhole tools, including, but not limited to, LWD/MWD systems, telemetry systems, downhole motors to drive the drill bit 14, and rotary steerable assemblies for changing the drilling direction of the drill bit 14. As depicted, the BHA 50 comprises LWD/MWD elements 26, telemetry element 28, and downhole power generator 30. As the bit 14 extends the borehole 16 through the formations 18, the LWD/MWD elements 26 may collect measurements relating to borehole 16. The LWD/MWD elements 26 may be communicably coupled to the telemetry element 28. The telemetry element 28 may transfer measurements from LWD/MWD elements 26 to a surface receiver and/or to receive commands from the surface receiver via a system controller 32. The telemetry element 28 may comprise a mud pulse telemetry system, an acoustic telemetry system, a wired communications system, a wireless communications system, or any other type of communications system that would be appreciated by one of ordinary skill in the art in view of this disclosure. In certain embodiments, some or all of the measurements taken at the LWD/MWD elements 26 may also be stored within the LWD/MWD elements 26 or the telemetry element 28 for later retrieval at the surface 82 by the system controller 32.

The downhole power generator 30 may be coupled and provide power to electronic components within the BHA 50, including electronic components within the LWD/MWD elements 26 and telemetry system 28. Example electronic components include, but are not limited to, sensors, control units, motors, and solenoids. The downhole power generator 30 may comprise one or more alternators and associated circuitry to generate AC output signals that are then converted to provide DC power to the BHA 50 and electrical components thereof. The generator 30 may generate power based on the operation of drill string 8, or based on the flow of drilling fluid through components of drilling system 80. The amount of power provided by the generator 30 may depend, in part, on the power requirements of the electronic components in the BHA 50, the number of alternators within the generator 30, and the power ratings of the electronic components within the generator 30. The number and arrangement of alternators may depend, in part, on the configuration of the generator 30 and the voltage requirements of the BHA 50. In some embodiments, as will be described in detail below, one or more current sensing circuits may be included in the generator 30 to control and protect electronic components from damage caused by harsh downhole conditions.

Figure 2:
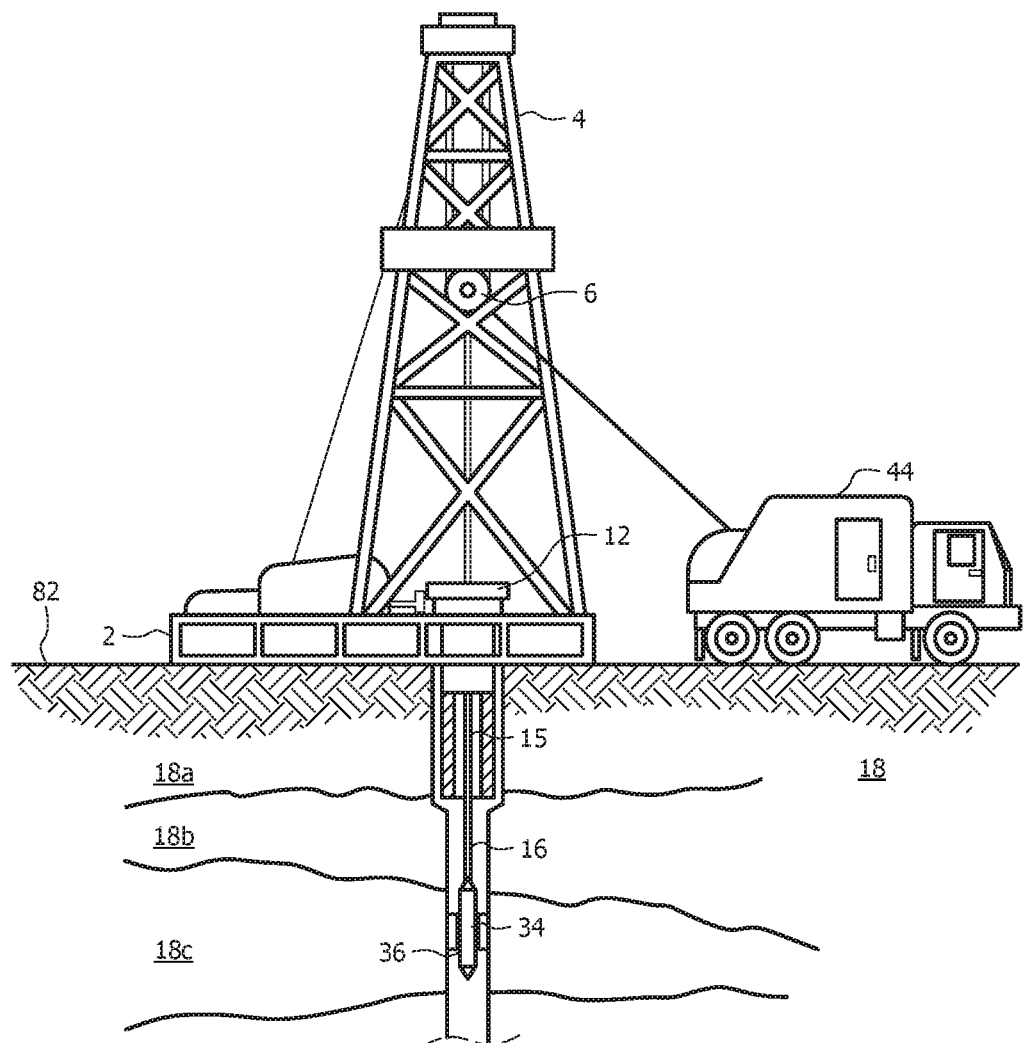
FIG. 2 illustrates an example subterranean drilling system with the drill string removed in accordance with embodiments of the present disclosure.

At various times during or after the drilling process, the drill string 8 may be removed from the borehole 16 as shown in FIG. 2. Once the drill string 8 has been removed, measurement/logging operations can be conducted using a wireline tool 34, i.e., an instrument that is suspended into the borehole 16 by a cable 15 having conductors for transporting power to the tool from a surface power source (e.g., a thermoelectric power generator), and telemetry from the tool body to the surface 82. The power transported from the surface may comprise AC power, for instance, that is converted to DC power downhole, or it may comprise DC power that is transmitted from the surface. The wireline tool 34 may comprise electronic components similar to the electronic components described above. For instance, the wireline tool 34 may comprise logging and measurement elements 36, similar to the LWD/MWD elements of BHA 50 described above, which may comprise one or more electronic components in the form of sensors and controllers. The logging and measurement elements 36 may perform functions such as measuring current, voltage, pressure, and/or temperature of electronic components associated with downhole tools (e.g., wireline tool 34).

The logging and measurement elements 36 may be communicatively coupled to the cable 15. A logging facility 44

(shown in FIG. 2 as a truck, although it may be any other structure) may collect measurements from the tool 36, and may include computing facilities (including, e.g., a control unit/information handling system) for controlling, processing, storing, and/or visualizing the measurements gathered by the elements 36. The computing facilities may be communicatively coupled to the elements 36 by way of the cable 15. In certain embodiments, the system controller 32 may serve as the computing facilities of the logging facility 44.

Modifications, additions, or omissions may be made to FIGS. 1-2 without departing from the scope of the present disclosure. For instance, FIGS. 1-2 illustrate components of subterranean drilling system 80 in a particular configuration. As an example, the position of the generator 30 within the BHA 50 of the system 80 may differ from the embodiment depicted. It will be understood that any suitable configuration of components for drilling or logging a wellbore may be used. Furthermore, fewer components or additional components beyond those illustrated may be included in subterranean drilling system 80 without departing from the scope of the present disclosure.

Collecting well log data from boreholes (e.g., borehole 16) drilled in the earth provides information that may be analyzed for subsurface formation depth structure within oil or gas fields. The information derived may indicate the type of rock in the subsurface and may be used to identify boundaries of geologic intervals in the formation depth structure. Geological intervals are layers of rock structure estimated to have the same geological age. Depending on the context, the term "geological interval" may also refer to the intersection between the geological layer and wellbore. Identifiable boundaries of geologic intervals are referred to as geologic markers or geologic tops.

Nuclear, gamma ray, gamma ray intensity, electromagnetic, sonic, magnetic, or other source instrumentation may be lowered into the boreholes to generate source signals that probe the underground formations. The formations or geologic tops modify or respond to the source signals, and sensors disposed with the source instrumentation in the boreholes may monitor the resulting or modified response signals. The response signal characteristics, for example, its amplitude, vary with different types of source signals and also depend on the type of formation or geologic top observed. In some embodiments, the response signal characteristics may represent one or more data measurements indicative of density, porosity, velocity, resistivity, or permeability of a certain formation or sample. Additionally or alternatively, the response signal characteristics may comprise temperature, wind speed, and rainfall measurements at a particular location and/or time. Such data may be collected over time and collectively called "well log curves" or "well logs." The well logs may be recorded as a function of depth in the boreholes, one recorded curve (or trace) for each type of source.

In some embodiments, multiple boreholes may be used to collect data from multiple wells, and to spatially track the various formations or geologic tops under test. For example, a number of bores may be bored at locations miles or hundreds of yards apart for such analysis. For deeper analysis, hundreds or thousands of wells may be bored, where each well may be spaced from about one-quarter to one-half mile apart. Boring to a typical depth of 10,000 feet allows multiple formations to be observed in the response traces. A geoscientist may then map the location of the subsurface formations from multiple numbers of well logs. This generally refers to a correlation process, in which the geologist attempts to match features in traces recorded from one well log to similar features in traces from one or more other well logs.

Geologic correlation workflow is frequently used in a number of activities such as mining, oil and gas exploration and production, geothermal development, water extraction, $CO_2$ sequestration, geologic engineering, waste management, etc. However, the interpretation of geologic tops in oil or gas fields can often be difficult and time consuming. For example, although interpreters may manually correlate a small number of well logs in a matter of minutes, this task becomes more difficult and time consuming as the number of logs increases. To facilitate the correlation process, dynamic time warping (DTW) may be employed to measure similarity between two sequences of well data or well logs, and/or to align two sequences that may vary in speed, where such sequences may include time-dependent sequences, space-ordered sequences, and/or depth-ordered sequences. For example, DTW may provide an optimal alignment between two time series of data if one time series of data is "warped" by expanding or condensing that time series along its time axis. This warping between the two time series of data may then be used to locate corresponding regions between the time series of data or to determine similarity between the two time series of data.

In some embodiments, data from well logs may be used to acquire certain types of signal sequences such as density, porosity, formation resistivity, velocity, and/or permeability measurements of a particular rock sample. It is to be understood that other suitable types of signal sequences may be acquired from well logs in accordance with embodiments of the disclosure. In additional or alternative embodiments, data from other sensors may be used to acquire signal sequences comprising, for example, temperature, wind speed, and/or rainfall measurements at a particular location and time.

In well logging applications, a result of DTW can include a set of correlated points between two sequences of well data, e.g., points [1, 2, 3, 4, 5] in one well log may correlate to points [3, 4, 5, 6, 7, 9] in another well log. When performing signal alignment in practice, a human expert or user may decide to override certain choices made by the DTW algorithm. This may be achieved by imposing certain constraints (e.g., forcing point a in signal one to align with point b in signal two), as deemed appropriate by the expert or user. For example, assume a selection of "user picks" are available. These picks may be used as mapping constraints from the user to which the output of the DTW algorithm should conform, e.g., if, in the user's opinion, a particular point in one signal should map to a specific point in another signal.

Figure 3:
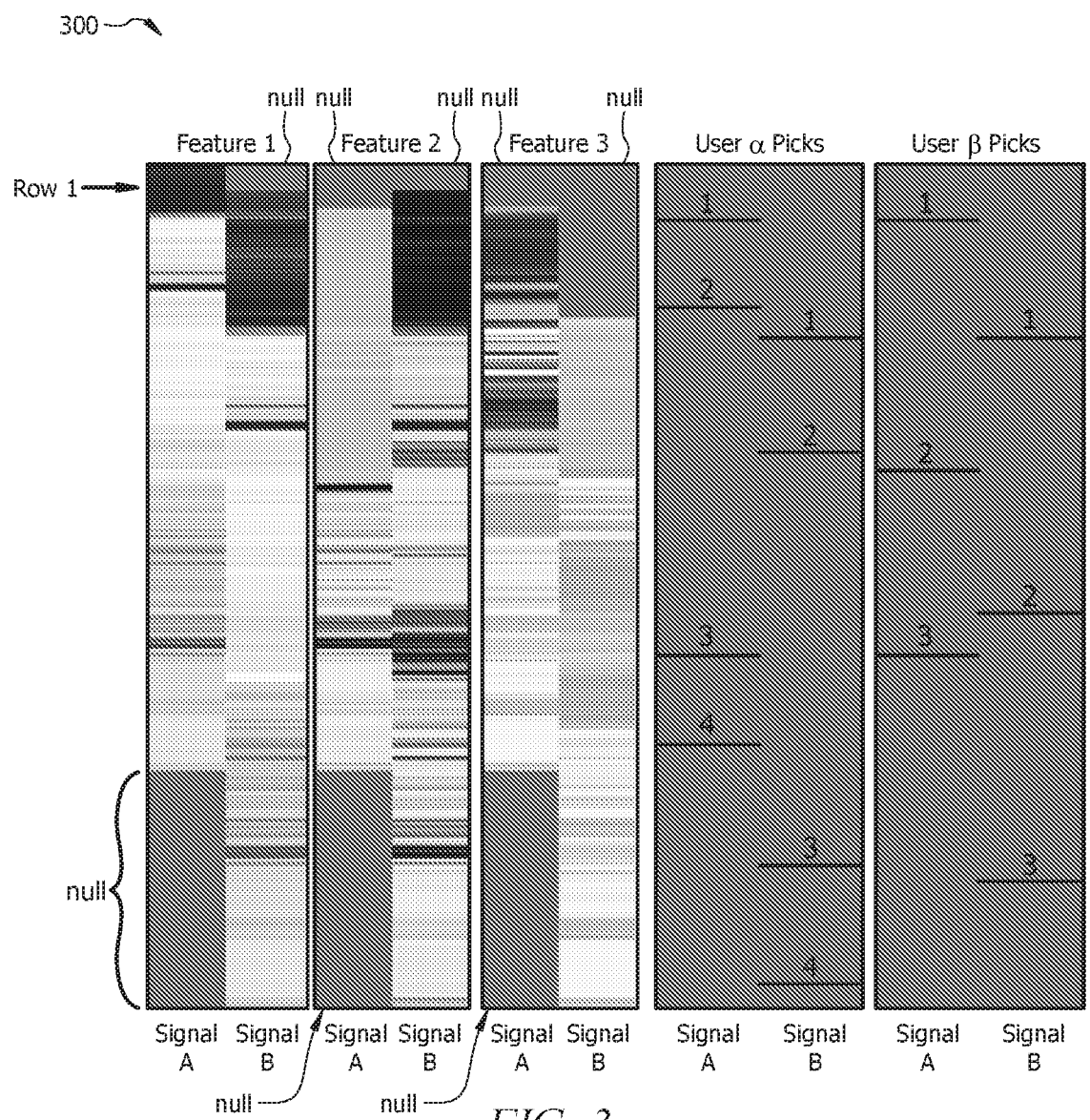
FIG. 3 illustrates an example heat map representation of two signal sequence to be correlated with one another sequence in accordance with embodiments of the present disclosure.

FIG. 3 depicts an example of a heat map 300 representation of two signals Signal A and Signal B to be correlated with one another according to embodiments of the present disclosure. Signal A includes a first sequence of data and Signal B includes a second sequence of data. In some implementations, the first and second sequences of data may comprise time-series data, space-ordered data, and/or depth-ordered data.

The heat map 300 includes user picks from $n_u$, where $n_u$ is equal to 2 in FIG. 3. For example, the heat map 300 includes four user picks 1, 2, 3, and 4 from a first user denoted as User α, and three user picks 1, 2, and 3 from a second user denoted as User β. It should be understood that in other implementations, the heat map 300 may comprise more or less user picks from User α and/or User β, and that $n_u$ may be an integer greater than or less than 2. Moreover, it should be understood that the picks numbered 1, 2, 3, and 4 for User α do not necessarily have any correspondence to the picks number 1, 2, and 3 for User β, i.e., each user may utilize their own numbering system.

Signals A and B each comprise a number $n_f$ of features, where $n_f$ may be any integer greater than or equal to 1. In FIG. 3, $n_f$ is equal to 3, but $n_f$ may be less than or greater than 3 in other implementations. As discussed further below, Signal A corresponds to a first well log containing measurements from a first well (not shown), while Signal B corresponds to a second well log containing measurements from a second well (not shown). The first and second wells may be located in a similar area and at a known distance apart from one another (e.g., 100 yards). The first and second wells may comprise different materials (e.g., rock, soil, oil, water, or gas) and vary in thickness and shape. In Signal A and Signal B, the uppermost top rows represent data from top portions at each surface of the first and second wells, while the lowermost bottom rows represent data from bottom portions of the first and second wells.

The features 1-3 of Signal A and the features 1-3 of Signal B correspond to measurement parameters acquired from the first well log and the second well, respectively. Generally speaking, the measurement parameters may correspond to measurements of any desired characteristics of formations associated with the first and second wells. For discussion purposes, it may be assumed that feature 1 of Signals A and B corresponds to respective density measurements from the first and second wells; feature 2 of Signals A and B corresponds to respective porosity measurements from the first and second wells; and features 3 of Signals A and B corresponds to respective permeability measurements from the first and second wells.

To correlate data acquired from the first well to data acquired from the second well, a certain value or data point (a) from Signal A may be compared to a certain value or data point (b) from Signal B. It should be understood that data points (a) and (b) need not be from the same sample location in Signals A and B. As Signals A and B each refer to signals having three features 1, 2, and 3, both signals may be described as hyper-complex signals comprising $n_f$ components. For example, data points (a) and (b) may be generalized as a=[$a_1, a_2, \ldots, a_n$] and b=[$b_1, b_2, \ldots, b_n$], where n=$n_f$.

In some embodiments, a dynamic time warping (DTW) technique may be employed when correlating data acquired from the first well to data acquired from the second well. When performing DTW according to standard techniques, the distance between a given point in Signal A and a given point in Signal B may be calculated using various distance metrics such as Euclidean distance, Manhattan distance, Canberra distance, and the like. For instance, the distance may be determined by calculating the $l^k$ norm according to the following equation:

$$\varepsilon_k(a, b) = \sqrt[k]{\sum_i |\delta_i|^k} \quad \text{(Equation 1)}$$

where $\delta_i = a_i - b_i$.

In the equation above, $\varepsilon_k$ denotes the distance between data points a and b, k denotes a number of a norm 1, and i denotes the number of features in Signals A and B. Variable k may typically be equal to 1 or 2, meaning the $l^1$ norm is used or the $l^2$ norm is used, where the $l^1$ norm refers to the Manhattan distance metric and the $l^2$ norm refers to the Euclidean distance metric. When using the Euclidean distance metric, Equation 1 may be used to calculate the distance between the data point comprising components $a_1$, $a_2$, $a_3$ in Series 1 and the data point comprising components $b_1$, $b_2$, $b_3$ in Series 2 as shown below.

$$\varepsilon_2(a,b) = \sqrt{\delta_1^2 + \delta_2^2 + \delta_3^2},$$

where $\delta_1^2 = (a_1 - b_1)^2$, $\delta_2^2 = (a_2 - b_2)^2$, and $\delta_3^2 = (a_3 - b_3)^2$.

In the present example, assume that the user picks 1-4 of User α and the user picks 1-3 of User β comprise constraints imposed by each user. For each user, a monotonically increasing list of matching points may be formed for the two sequences corresponding to Signals and B. As an example, Table 1 below shows that User a has provided four picks 1-4 to constrain the mapping of signals A and B.

TABLE 1

| Alignment Picks from User α | | |
|---|---|---|
| Pick number: $p_j^\alpha$ | Signal A index: $i_A(p_j^\alpha)$ | Signal B index: $i_B(p_j^\alpha)$ |
| 1 | 128 | 355 |
| 2 | 296 | 575 |
| 3 | 968 | 1374 |
| 4 | 1140 | 1603 |

According to Table 1, the first pair of user picks in FIG. 3 reflects that User α has indicated that one or more features at point 128 of Signal A match up with one or more features at point 355 of Signal B, as respectively designated by $i_A(p_j^\alpha)$ and $i_B(p_j^\alpha)$. Similarly, the second, third, and fourth pairs of user picks reflects that User α has indicated that one or more features at points 296, 968, and 1140 of Signal A match up with one or more features at respective points 575, 1374, and 1603 of Signal B.

In an embodiment, for each combination of user (e.g., User α or User β) and signal (e.g., Signal A or B), a sparse sequence may be created with a data point for each pick. The value at these data points may be defined as the pick number $p_j^u$ (e.g., 1, 2, 3, and 4 for User α) and null at all other locations lacking a user pick (e.g., at the cells in the very top row of Signals A and B). For example, FIG. 4 depicts an example of a sparse sequence 400 representing the Signal A pick from User α.

In an embodiment, after creating sparse sequences for each user pick, the $n_u$ sparse sequences may be combined with the original signal (i.e., Signal A or Signal B with $n_f$ components) as additional orthogonal components. The resulting combination is a hyper-complex signal with $n_f + n_u$ components, as graphically depicted in FIG. 3 by the four pairs of picks from User α (i.e., pick 1 for Signals A and B, pick 2 for Signals A and B, and so on) and the three pairs of picks from User β. Note that except for the four pairs of User α Picks and the three pairs of User β Picks, all other cells under the User α Picks and User β Picks in Signals A and B are null (i.e., those cells do not contain data). Thus, the added user pick components are mostly null except the 4 data points for the User α Picks and the 3 data points for the User β Picks.

In some implementations, DTW may be performed using Equation 1 above to correlate data from Signal A to data from Signal B. For example, since the Signals A and B have been modified to include two additional signal components $n_u$, these two additional components may be accounted for when calculating distance according to Equation 1. For example, $\varepsilon_k(a,b)$ may be solved by taking the square root of the sum, $\delta_1^2+\delta_2^2+\delta_3^2+\delta_4^2+\delta_5^2$, where $\delta_1^2=(a_1-b_1)^2$, $\delta_2^2=(a_2-b_2)^2$, $\delta_3^2=(a_3-b_3)^2$, $\delta_4^2=(a_4-b_4)^2$, and $\delta_5^2=(a_5-b_5)^2$.

However, complications can arise when performing DTW to calculate distance between two data points a and b if one or both data points contain a null component. As shown in FIG. 3, a set of cells at the bottom of each Signal A in features 1-3 contain nulls, while a few other cells near the top of Signals A and/or B in features 1-3 contains nulls. Moreover, Signals A and B have been modified to include the $n_u$ sparse sequences corresponding to the User α Picks and User β Picks, which contain null data. Consequently, performing DTW to correlate data using existing techniques may not be feasible.

According to embodiments of the present disclosure, a distance metric is provided such that DTW may be performed to correlate a pair of sequence signals comprising one or more nulls. To this end, the distance between any two data points in a first sequence signal and a second sequence signal may be calculated using Equation 1 above, except the delta value $\delta_i$ for each component, i, may be calculated according to the following equation:

$$\delta_i = \begin{cases} a_i - b_i & \text{when neither } a_i \text{ nor } b_i \text{ is null} \\ C_i & \text{when exactly one of } a_i \text{ and } b_i \text{ is null,} \\ \lambda C_i & \text{when both } a_i \text{ and } b_i \text{ are null} \end{cases} \quad \text{(Equation 2)}$$

where $C_i$ denotes a constant value and $\lambda$ denotes a value between 1 and 2.

For example, Equation 2 may be employed when calculating distances for regular signal components (e.g., $n_f$), such as features 1, 2, and 3 of Signal A and features 1, 2, and 3 for Signal B. Redefining the delta value according to Equation 2 ensures a non-negative real distance value is generated even when data is missing from one or more components of a first sequence signal and/or a second sequence signal.

In some embodiments, the value of the constant $C_i$ may be determined empirically, e.g., based on the distribution of values in $i^{th}$ component in the two sequence Signals A and B. In embodiments employing DTW, the value of the constant $C_i$ may be defined to be half of the difference between the $80^{th}$ percentile and the $20^{th}$ percentile of the combined set of data points from the $i^{th}$ component of Signal A and Signal B, so as to exclude any extreme outsiders falling outside the $80^{th}$ and $20^{th}$ percentiles. By defining the constant $C_i$ in this manner, the distance between a valid data value and a null value may be noticeably high compared to the distance between that valid data value and one of its neighboring valid data values. This distance between that valid data value and null value may be even higher when performing a medium to high level of autocorrelation within each of Series 1 and 2.

In some embodiments, lambda $\lambda$ may be equal to a constant between one and two. According to some aspects, the value of $\lambda$ should be greater than one, but less than or equal to two. For example, having a value of $\lambda$ greater than one may ensure that the distance between null values is always greater than the distance between a real value and a null value. Further, in embodiments employing DTW, the value of $\lambda$ may be equal to about 1.5.

In an embodiment, when calculating distances for user pick components (e.g., $n_u$) such as user picks 1-4 and 1-3 for User α and User β, the distance may be calculated using Equation 1 above, except the delta value $\delta_i$ for each component may be calculated according to the following equation:

$$\delta_i = \begin{cases} w_u(a_i - b_i) & \text{when neither } a_i \text{ nor } b_i \text{ is null} \\ w_u & \text{when exactly one of } a_i \text{ and } b_i \text{ are null,} \\ 0 & \text{when both } a_i \text{ and } b_i \text{ are null} \end{cases} \quad \text{(Equation 3)}$$

where $w_u$ denotes a weight chosen according to a level of skill of a user u.

Redefining the delta value according to Equation 3 can ensure that there is a significant contribution to the DTW error calculation when a pair of user picks does not align.

Continuing with the above example (i.e., with $n_f=3$ and picks/constraints from $n_u=2$), assume that the data for each feature 1, 2, and 3 is normalized in the range from 0 to 100. Also assume that User α has a higher skill at selecting picks than User β Therefore, a higher weight may be assigned to User α than to User β For example, User α may be assigned a weight of $w_\alpha=2000$, while User β may be assigned a weight of $w_\beta=1000$. Assigning such relatively high weight can ensures that minimizing the user pick error is prioritized over minimizing the regular feature error for the small number of data points where user picks are present.

Figure 5:
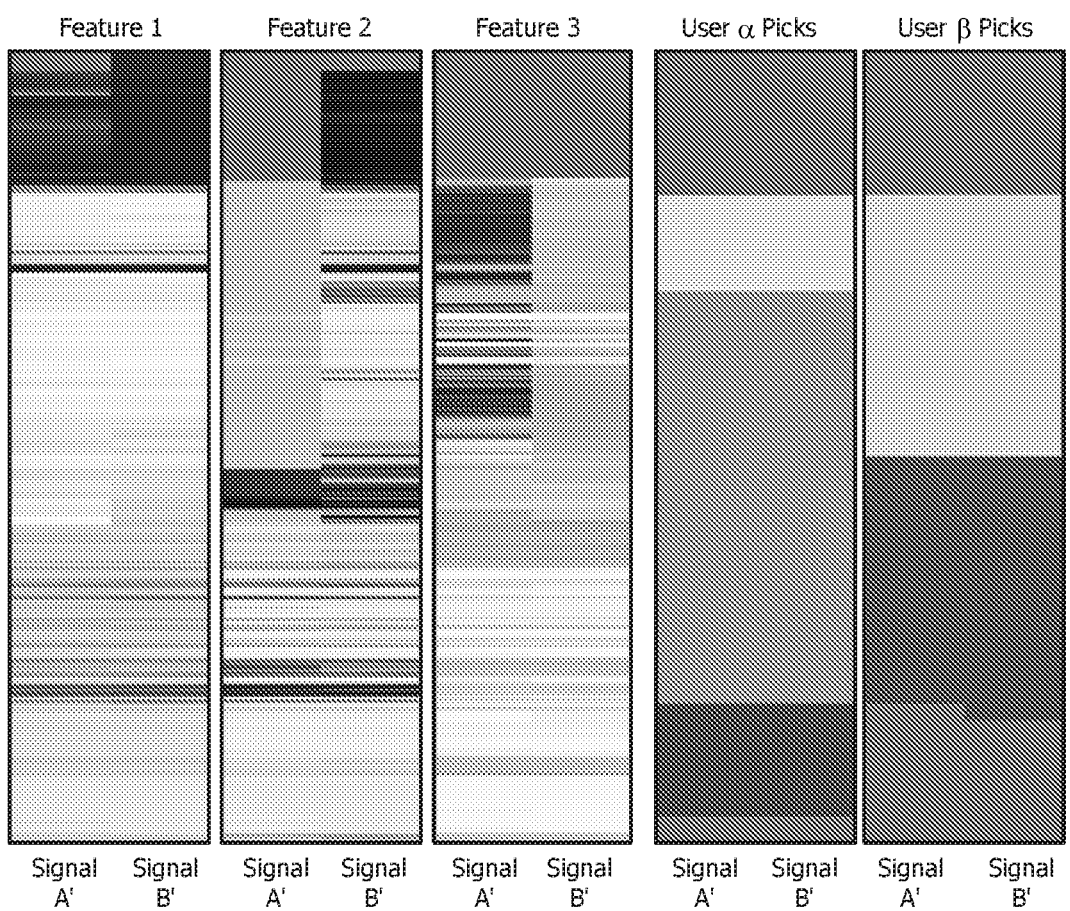
FIG. 5 illustrates an example result of a dynamic time warping operation performed in accordance with embodiments of the disclosure.

After assigning weights to User α and User β, DTW may be performed on the two hyper-complex Signals A and B (each with $n_f+n_u$ components) shown in FIG. 3. As a result, an alignment 500 may be generated as illustrated in FIG. 5, where Signals A' and B' reflect the alignment between Signals A and B in FIG. 3. It can be seen from the alignment result 500 that the four picks for User α are perfectly aligned. It can also be seen that for User β, the top two picks are aligned, while the third pick is slightly misaligned. The reason for this misalignment is apparent from FIG. 3, where it can be observed that the third pair of picks from User α and User β conflict with one another. Consequently, the DTW algorithm in this example has selected to prioritize User α over User β, i.e., since $w_\alpha > w_\beta$.

Figure 6:
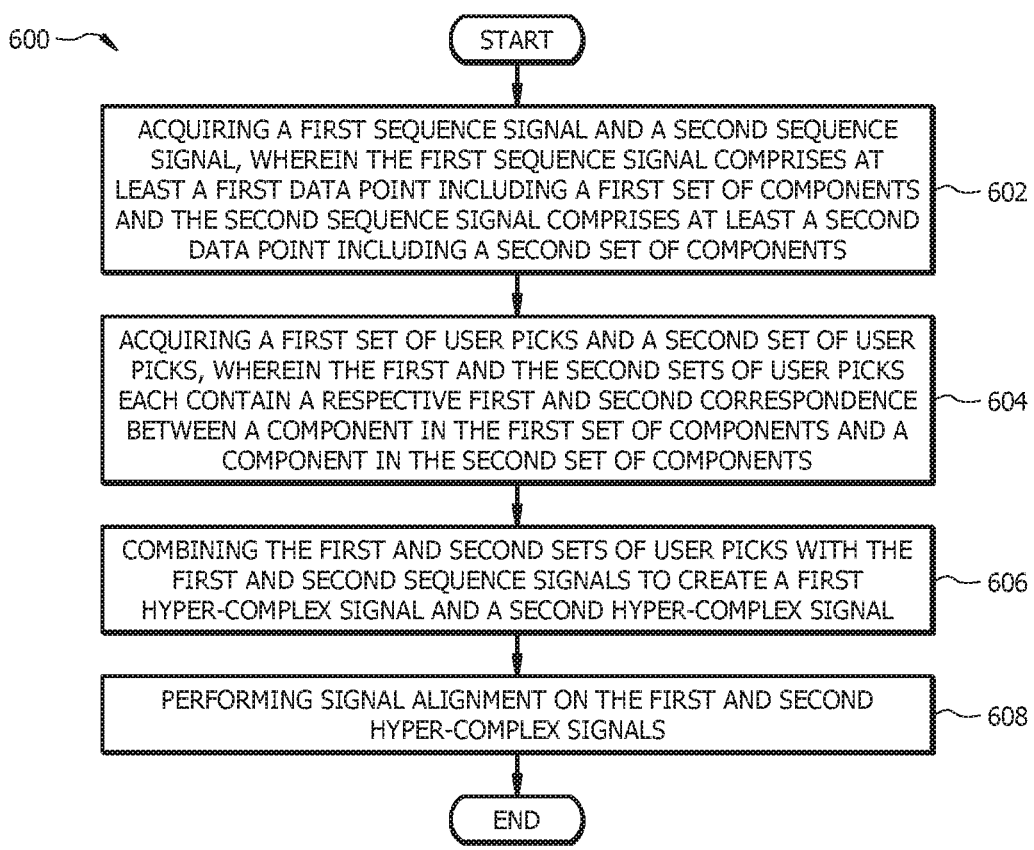
FIG. 6 illustrates a flowchart for correlating well logs from different wells in accordance with embodiments of the present disclosure.

FIG. 6 illustrates a method 600 for correlating data in accordance with embodiments of the present disclosure. The operations may be performed in the order shown, or in a different order. Further, two or more of the operations may be performed concurrently instead of sequentially. In some implementations, some of the operations of the method 600 can be implemented as instructions stored in a storage device and executed by a controller and/or processor.

At block 602, the method 600 includes acquiring a first sequence signal and a second sequence signal, where the first sequence signal comprises at least a first data point including a first set of components and the second sequence signal comprises at least a second data point including a second set of components. In some implementations, the first and second sequence signals may comprise time-dependent sequences, space-ordered sequences, and/or depth-ordered sequences. In addition, the first and second sets of components may comprise measurement parameters associated with a first well and second well, respectively.

At block 604, the method 600 includes acquiring a first set of user picks and a second set of user picks, where the first and the second sets of user picks each contain a respective first and second correspondence between a component in the first set of components and a component in the second set of components. For example, the first correspondence may indicate that a user making the first set of user picks has identified one or more features at a point in the first sequence signal that matches up with one or more features at a point in the second sequence signal. Similarly, the second correspondence may indicate that a user making the second set of user picks has identified one or more features at a point in the first sequence signal that matches up with one or more features at a point in the second sequence signal.

At block 606, the method 600 includes combining the first and second sets of user picks with the first and second sequence signals to create a first hyper-complex signal and a second hyper-complex signal. For example, the first and second hyper-complex signals may contain real-value components such as the first and second set of components in the first and second sequence signals, as well as imaginary components corresponding to the first and second sets of user picks.

At block 608, the method includes performing signal alignment on the first and second hyper-complex signals. Because the first and second sets of user picks may be combined with the first and second sets of components, the result of the signal alignment may represent a mapping between the first and second sequence signals that is consistent with the user picks. In some implementations, performing the signal alignment at block 608 may comprise performing DTW on the first and second hyper-complex signals.

Figure 7:
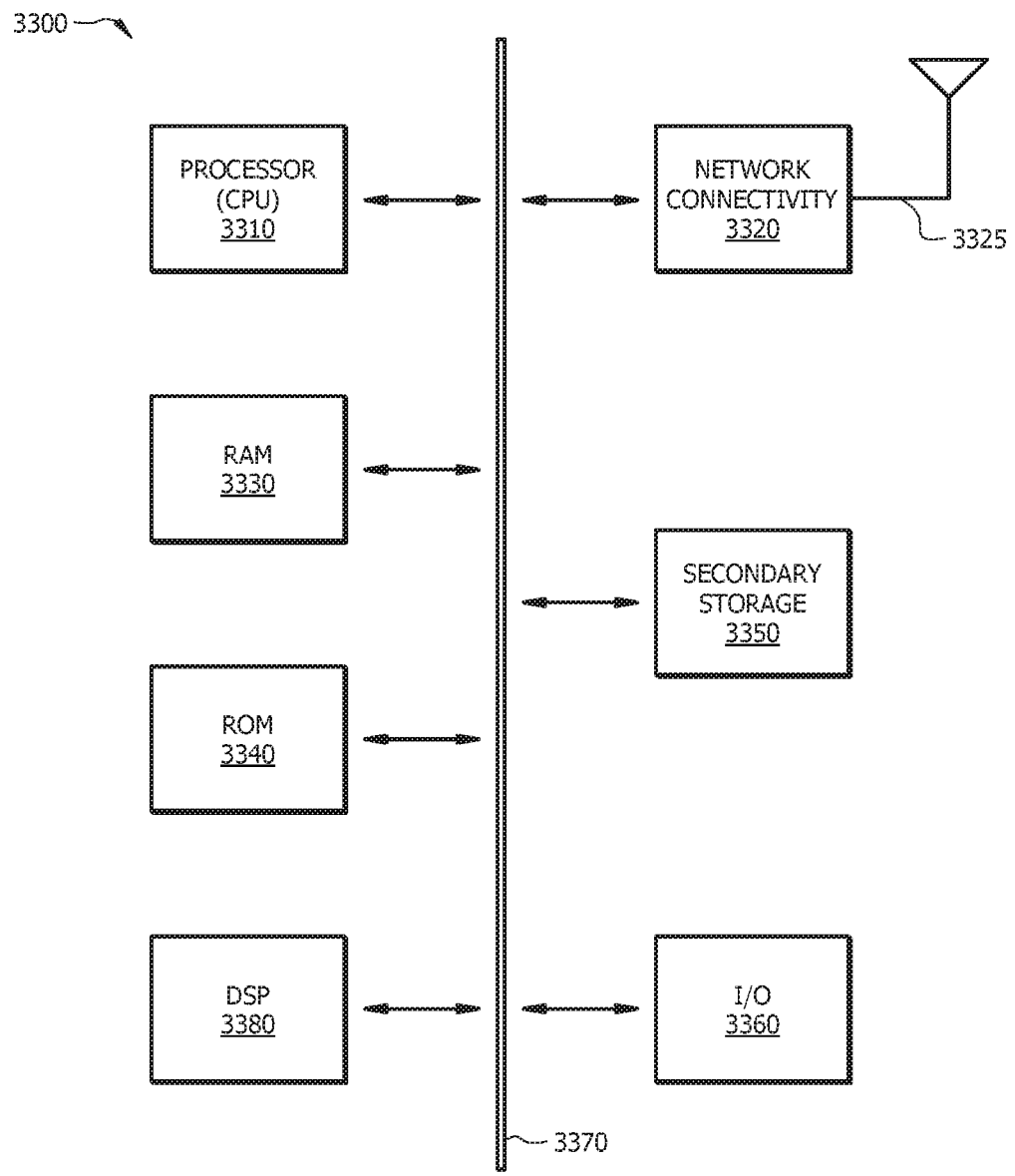
FIG. 7 illustrates a schematic of a computer system and related components suitable for implementing embodiments of the present disclosure.

FIG. 7 illustrates an example of a computer system 3300 that includes a processing component 3310 suitable for implementing embodiments disclosed herein. In addition to the processor 3310 (which may be referred to as a central processor unit (CPU)), the system 3300 might include network connectivity devices 3320, random access memory (RAM) 3330, read only memory (ROM) 3340, secondary storage 3350, input/output (I/O) devices 3360, and a digital signal processor (DSP) 3380. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, Universal Serial Bus (USB) interface devices, serial interfaces, token ring devices, fiber distributed data interface (FDDI) devices, wireless local area network (WLAN) devices, radio transceiver devices such as code division multiple access (CDMA) devices, new generation radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly. Signals received by network connectivity devices 3320 may be processed by one or more components of the system 3300 to perform functions such as signal amplification, frequency down conversion, filtering, channel selection, and the like. Analog to digital (A/D) conversion of signals may allow more complex communication functions, such as demodulation and decoding to be performed in the DSP 3380. In a similar manner, signals to be transmitted are processed, including modulation and encoding for example, by DSP 3380 and are processed by one or more components of the computer system 3300 for digital to analog (D/A) conversion, frequency up conversion, filtering, amplification, and transmission. DSP 3380 may be configured to process communication signals and provide for receiver and transmitter control. For example, gains applied to communication signals received or transmitted via the computer system 3300 may be adaptively controlled through automatic gain control algorithms implemented in DSP 3380.

The RAM 3330 might be used to store volatile data and/or instructions that are executed by the processor 3310. The ROM 3340 may be a non-volatile memory device having a smaller memory capacity than the memory capacity of the secondary storage 3350. ROM 3340 might be used to store instructions and/or data that are read during execution of the instructions. Access to both RAM 3330 and ROM 3340 may typically be faster than access to secondary storage 3350. The secondary storage 3350 may comprise of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, graphical user interfaces (GUIs), card readers, paper tape readers, printers, video monitors, or other well-known input/output devices. Also, the transceiver 3325 might be considered to be a component of the I/O devices 3360 instead of or in addition to being a component of the network connectivity devices 3320.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

The terms "couple" or "couples" as used herein are intended to mean either an indirect or a direct connection. Thus, if a first device couples to a second device, that connection may be through a direct connection, or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. Finally, the term "uphole" as used herein means along the drill string or the hole from the distal end towards the surface, and "downhole" as used herein means along the drill string or the hole from the surface towards the distal end.

It is to be understood that any one or more of the embodiments disclosed herein may be implemented by a controller or control unit. For purposes of this disclosure, a controller or control unit may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a controller or control unit may be a personal computer, a network storage device, or any other suitable device and may vary in size, shape, performance, functionality, and price. The controller or control unit may include random access memory (RAM), one or more processing resources such as a central processing unit (CPU) or hardware or software control logic, ROM, and/or other types of nonvolatile memory. Additional components of the controller or control unit may include one or more disk drives, one or more network ports for communication with external devices as well as various input and output (I/O) devices, such as a keyboard, a mouse, and a video display. The controller or control unit may also include one or more buses operable to transmit communications between the various hardware components.

Further, the controller or control unit may comprise or be connected to computer-readable media. For purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

The foregoing describes in detail a current sensing system, method, and apparatus in accordance with embodiments of the present disclosure. In this specification, examples are used to describe principles and implementations of the present disclosure, and the description of the embodiments is only intended to help understand such principles and implementations. In conclusion, the content of this specification shall not be construed as a limitation on the present disclosure.

ADDITIONAL DISCLOSURE

The following are non-limiting, specific embodiments in accordance with the present disclosure:

A first embodiment, which is a method for correlating data, comprising acquiring a first sequence signal and a second sequence signal, wherein the first sequence signal comprises at least a first data point including a first set of components and the second sequence signal comprises at least a second data point including a second set of components, acquiring a first set of user picks and a second set of user picks, wherein the first and the second sets of user picks each contain a respective first and second correspondence between a component in the first set of components and a component in the second set of components, combining the first and second sets of user picks with the first and second sequence signals to create a first hyper-complex signal and a second hyper-complex signal, and performing signal alignment on the first and second hyper-complex signals.

A second embodiment, which is the method of the first embodiment, wherein performing the signal alignment comprises performing dynamic time warping (DTW) on the first and second hyper-complex signals.

A third embodiment, which is the method of the first or the second embodiment, wherein the first sequence signal and the second sequence signal are acquired from a log of a first well and a log of a second well, respectively.

A fourth embodiment, which is the method of the third embodiment, wherein the first set of components in the first data point represent parameters at a first depth of a borehole within the first well, and wherein the second set of components in the second data point represent parameters at a second depth of a borehole within the second well.

A fifth embodiment, which is the method of the fourth embodiment, wherein a first signal component in the first set of components represents a same type of parameter represented by a signal component in the second set of components, and wherein a second signal component in the first set of components represents another type of parameter represented by another signal component in the second set of components.

A sixth embodiment, which is the method of the fourth embodiment, wherein the parameters represented by the first and second components comprise at least two or more of density measurements, porosity measurements, permeability measurements, gamma ray measurements, formation resistivity measurements, or velocity measurements.

A seventh embodiment, which is the method of any of the first through the sixth embodiments, wherein performing the signal alignment comprises calculating a distance between the first data point and the second data point according to the following equation:

$$\varepsilon_k(a, b) = \sqrt[k]{\Sigma_i |\delta_i|^k},$$

wherein $\varepsilon_k$ denotes the distance between data points a and b, wherein a denotes the first data point and b denotes the second data point, wherein k denotes a norm number, wherein i denotes a quantity of signal components in the first and second sets of components, and wherein $\delta_i$ denotes a delta value for at least one of a signal component or a user pick.

An eighth embodiment, which is the method of the seventh embodiment, wherein the components in the first and second sets of components contain valid data, nulls, or a combination thereof, and wherein the first and second sets of user picks contain valid data, nulls, or a combination thereof.

A ninth embodiment, which is the method of the eighth embodiment, wherein the delta value for the signal component is calculated according to the following equation:

$$\delta_i = \begin{cases} a_i - b_i & \text{when neither } a_i \text{ nor } b_i \text{ is null} \\ C_i & \text{when exactly one of } a_i \text{ and } b_i \text{ is null,} \\ \lambda C_i & \text{when both } a_i \text{ and } b_i \text{ are null} \end{cases}$$

wherein $C_i$ denotes a first constant and $\lambda$ denotes a second constant.

A tenth embodiment, which is the method of the eighth embodiment, wherein the delta value for the user pick is calculated according to the following equation:

$$\delta_i = \begin{cases} w_u(a_i - b_i) & \text{when neither } a_i \text{ nor } b_i \text{ is null} \\ w_u & \text{when exactly one of } a_i \text{ and } b_i \text{ are null,} \\ 0 & \text{when both } a_i \text{ and } b_i \text{ are null} \end{cases}$$

wherein $w_u$ denotes a user weight, and wherein the user weight is selected according to a skill level of a user associated with the user pick.

An eleventh embodiment, which is a non-transitory storage medium comprising computer-readable instructions executable by a processor to implement a method for correlating data, the method comprising acquiring a first sequence signal and a second sequence signal, wherein the first sequence signal comprises at least a first data point including a first set of components and the second sequence signal comprises at least a second data point including a second set of components, acquiring a first set of user picks and a second set of user picks, wherein the first and the second sets of user picks each contain a respective first and second correspondence between a component in the first set of components and a component in the second set of components, combining the first and second sets of user picks with the first and second sequence signals to create a first hyper-complex signal and a second hyper-complex signal, and performing signal alignment on the first and second hyper-complex signals.

A twelfth embodiment, which is the non-transitory storage medium of the eleventh embodiment, wherein performing the signal alignment comprises performing dynamic time warping (DTW) on the first and second hyper-complex signals.

A thirteenth embodiment, which is the non-transitory storage medium of the eleventh or the twelfth embodiment, wherein the first sequence signal and the second sequence signal are acquired from a log of a first well and a log of a second well, respectively.

A fourteenth embodiment, which is the non-transitory storage medium of the thirteenth embodiment, wherein the first set of components in the first data point represent parameters at a first depth of a borehole within the first well, and wherein the second set of components in the second data point represent parameters at a second depth of a borehole within the second well.

A fifteenth embodiment, which is the non-transitory storage medium of the fourteenth embodiment, wherein a first signal component in the first set of components represents a same type of parameter represented by a signal component in the second set of components, and wherein a second signal component in the first set of components represents another type of parameter represented by another signal component in the second set of components.

A sixteenth embodiment, which is the non-transitory storage medium of the fourteenth embodiment, wherein the parameters represented by the first and second components comprise at least two or more of density measurements, porosity measurements, permeability measurements, gamma ray measurements, formation resistivity measurements, or velocity measurements.

A seventeenth embodiment, which is the non-transitory storage medium of any of the eleventh through the sixteenth embodiments, wherein performing the signal alignment comprises calculating a distance between the first data point and the second data point according to the following equation:

$$\varepsilon_k(a, b) = \sqrt[k]{\Sigma_i |\delta_i|^k},$$

wherein $\varepsilon_k$ denotes the distance between data points a and b, wherein a denotes the first data point and b denotes the second data point, wherein k denotes a norm number, wherein i denotes a quantity of signal components in the first and second sets of components, and wherein $\delta_i$ denotes a delta value for at least one of a signal component or a user pick.

An eighteenth embodiment, which is the non-transitory storage medium of the seventeenth embodiment, wherein the components in the first and second sets of components contain valid data, nulls, or a combination thereof, and wherein the first and second sets of user picks contain valid data, nulls, or a combination thereof.

A nineteenth embodiment, which is the non-transitory storage medium of the eighteenth embodiment, wherein the delta value for the signal component is calculated according to the following equation:

$$\delta_i = \begin{cases} a_i - b_i & \text{when neither } a_i \text{ nor } b_i \text{ is null} \\ C_i & \text{when exactly one of } a_i \text{ and } b_i \text{ is null,} \\ \lambda C_i & \text{when both } a_i \text{ and } b_i \text{ are null} \end{cases}$$

wherein $C_i$ denotes a first constant and $\lambda$ denotes a second constant.

A twentieth embodiment, which is the non-transitory storage medium of the eighteenth embodiment, wherein the delta value for the user pick is calculated according to the following equation:

$$\delta_i = \begin{cases} w_u(a_i - b_i) & \text{when neither } a_i \text{ nor } b_i \text{ is null} \\ w_u & \text{when exactly one of } a_i \text{ and } b_i \text{ are null,} \\ 0 & \text{when both } a_i \text{ and } b_i \text{ are null} \end{cases}$$

wherein $w_u$ denotes a user weight, and wherein the user weight is selected according to a skill level of a user associated with the user pick.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: R=R1+k*(Ru−R1), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method for correlating well log data, comprising:
acquiring, by a computer processor, a first sequence signal from at least one first logging tool lowered into a first borehole of a first well at a first speed and a second sequence signal from at least one second logging tool lowered into a second borehole of a second well at a second speed, the first sequence signal and the second sequence signal each being an ordered series having a shared ordering, wherein the first sequence signal comprises at least a first data point including a first set of components and a second data point including a second set of components, the first data point representing parameters at a first depth of the first well and the second data point representing parameters at a second depth of the first well, and wherein the second sequence signal comprises at least a third data point including a third set of components and a fourth data point including a fourth set of components, the third data point representing parameters at a first depth of the second well and the fourth data point representing parameters at a second depth of the second well;
acquiring, by the computer processor, a first set of user picks and a second set of user picks, wherein the first set of user picks contains a first correspondence between the first data point and the third data point, and wherein the second set of user picks contains a second correspondence between the second data point and the fourth data point;
combining, by the computer processor, the first set of user picks and the second set of user picks with the first sequence signal and the second sequence signal to create at least a first modified hyper-complex signal and a second modified hyper-complex signal;
performing, by the computer processor, signal alignment on the first modified hyper-complex signal and the second modified hyper-complex signal to correlate well data between the first sequence signal and the second sequence signal, the signal alignment comprising aligning the ordered series of the first modified hyper-complex signal and the ordered series of the second modified hyper-complex signal along the shared ordering, performing the signal alignment further comprising calculating a distance between a point a and a point b according to the following equation:

$$\varepsilon_k(a, b) = \sqrt[k]{\Sigma_i |\delta_i|^k},$$

wherein $\varepsilon_k$ denotes the distance between data points a and b, wherein a denotes the first data point or the second data point and b denotes the third data point or the fourth data point, wherein k denotes a norm number, wherein i denotes a quantity of signal components in the first, second, third, and fourth sets of components, and wherein $\delta_i$ denotes a delta value for at least one of a signal component or a user pick, and further wherein the delta value for the user pick is calculated according to the following equation:

$$\delta_i = \begin{cases} a_i - b_i & \text{when neither } a_i \text{ nor } b_i \text{ is null} \\ C_i & \text{when exactly one of } a_i \text{ and } b_i \text{ is null}, \\ \lambda C_i & \text{when both } a_i \text{ and } b_i \text{ are null} \end{cases}$$

wherein $w_u$ denotes a user weight, and wherein the user weight is selected according to a skill level of a user associated with the user pick; and
storing, based on the signal alignment, at least a first modified and aligned hyper-complex signal and a second modified and aligned hyper-complex signal, wherein at least one of the first data point or the second data point in the first modified and aligned hyper-complex signal aligns with at least one of the third data point or the fourth data point in the second modified and aligned hyper-complex signal.

2. The method of claim 1, wherein performing the signal alignment comprises performing dynamic time warping (DTW) on the first modified hyper-complex signal and the second modified hyper-complex signal, wherein at least one of the first modified hyper-complex signal or the second modified hyper-complex signal includes real-value components and imaginary components, wherein the real-value components correspond to at least one of the first, second, third, or fourth sets of components, and wherein the imaginary components correspond to at least one of the first or second sets of user picks.

3. The method of claim 1, further comprising generating a first well log and a second well log based on output signals of the at least one first logging tool and the at least one second logging tool, wherein the first sequence signal and the second sequence signal are acquired from the first well log and the second well log, respectively.

4. The method of claim 3, wherein the first set of components in the first data point and the second set of components in the second data point represent parameters at a first depth and a second depth of the first borehole within the first well, and wherein the third set of components in the third data point and the fourth set of components in the fourth data point represent parameters at a third depth and a fourth depth of the second borehole within the second well.

5. The method of claim 4, wherein a first signal component in the first set of components represents a same type of parameter represented by a signal component in the second set of components, and wherein a second signal component in the first set of components represents another type of parameter represented by another signal component in the second set of components.

6. The method of claim 4, wherein the parameters represented by components in the first, second, third, or fourth sets of components comprise at least two or more of density measurements, porosity measurements, permeability measurements, gamma ray measurements, formation resistivity measurements, or velocity measurements.

7. The method of claim 1, wherein the components in one or more of the first, second, third, or fourth sets of components contain valid data, nulls, or a combination thereof, and wherein the first and second sets of user picks contain valid data, nulls, or a combination thereof.

8. The method of claim 7, wherein the delta value for the signal component is calculated according to the following equation:

$$\delta_i = \begin{cases} w_u(a_i - b_i) & \text{when neither } a_i \text{ nor } b_i \text{ is null} \\ w_u & \text{when exactly one of } a_i \text{ and } b_i \text{ are null,} \\ 0 & \text{when both } a_i \text{ and } b_i \text{ are null} \end{cases}$$

wherein Ci denotes a first constant and λ denotes a second constant.

9. A non-transitory storage medium comprising computer-readable instructions executable by a processor to implement a method for correlating well log data, the method comprising:

acquiring a first sequence signal from at least one first logging tool lowered into a first borehole of a first well at a first speed and a second sequence signal from at least one second logging tool lowered into a second borehole of a second well at a second speed, the first sequence signal and the second sequence signal each being an ordered series having a shared ordering, wherein the first sequence signal comprises at least a first data point including a first set of components and a second data point including a second set of components, the first data point representing parameters at a first depth of the first well and the second data point representing parameters at a second depth of the first well, and wherein the second sequence signal comprises at least a third data point including a third set of components and a fourth data point including a fourth set of components, the third data point representing parameters at a first depth of the second well and the fourth data point representing parameters at a second depth of the second well;

acquiring a first set of user picks and a second set of user picks, wherein the first set of user picks contains a first correspondence between the first data point and the third data point, and wherein the second set of user picks contains a second correspondence between the second data point and the fourth data point;

combining, by the computer processor, the first set of user picks and the second set of user picks with the first sequence signal and the second sequence signal to create at least a first modified hyper-complex signal and a second modified hyper-complex signal;

performing signal alignment on the first modified hyper-complex signal and the second modified hyper-complex signal to correlate well data between the first sequence signal and the second sequence signal, the signal alignment comprising aligning the ordered series of the first modified hyper-complex signal and the ordered series of the second modified hyper-complex signal along the shared ordering, performing the signal alignment further comprising calculating a distance between a point a and a point b according to the following equation:

$$\varepsilon_k(a, b) = \sqrt[k]{\Sigma_i |\delta_i|^k},$$

wherein $\varepsilon_k$ denotes the distance between data points a and b, wherein a denotes the first data point or the second data point and b denotes the third data point or the fourth data point, wherein k denotes a norm number, wherein i denotes a quantity of signal components in the first, second, third, and fourth sets of components, and wherein $\delta_i$ denotes a delta value for at least one of a signal component or a user pick, and further wherein the delta value for the user pick is calculated according to the following equation:

$$\delta_i = \begin{cases} a_i - b_i & \text{when neither } a_i \text{ nor } b_i \text{ is null} \\ C_i & \text{when exactly one of } a_i \text{ and } b_i \text{ is null,} \\ \lambda C_i & \text{when both } a_i \text{ and } b_i \text{ are null} \end{cases}$$

wherein $w_u$ denotes a user weight, and wherein the user weight is selected according to a skill level of a user associated with the user pick; and storing, based on the signal alignment, at least a first modified and aligned hyper-complex signal and a second modified and aligned hyper-complex signal, wherein at least one of the first data point or the second data point in the first modified and aligned hyper-complex signal aligns with at least one of the third data point or the fourth data point in the second modified and aligned hyper-complex signal.

10. The non-transitory storage medium of claim 9, wherein performing the signal alignment comprises performing dynamic time warping (DTW) on the first modified hyper-complex signal and the second modified hyper-complex signal.

11. The non-transitory storage medium of claim 9, wherein the method further comprises generating a first well log and a second well log based on output signals of the at least one first logging tool and the at least one second logging tool, and wherein the first sequence signal and the second sequence signal are acquired from the first well log and the second well log, respectively.

12. The non-transitory storage medium of claim 11, wherein the first set of components in the first data point and the second set of components in the second data point represent parameters at a first depth and a second depth of the first borehole within the first well, and wherein the third set of components in the second data point and the fourth set of components in the fourth data point represent parameters at a third depth and a fourth depth of the second borehole within the second well.

13. The non-transitory storage medium of claim 12, wherein a first signal component in the first set of components represents a same type of parameter represented by a signal component in the third set of components, and wherein a second signal component in the first set of components represents another type of parameter represented by another signal component in the third set of components.

14. The non-transitory storage medium of claim 12, wherein the parameters represented by at least one of the first, second, third, or fourth sets of components comprise at least two or more of density measurements, porosity measurements, permeability measurements, gamma ray measurements, formation resistivity measurements, or velocity measurements.

15. The non-transitory storage medium of claim 9, wherein the components in one or more of the first, second, third, or fourth sets of components contain valid data, nulls, or a combination thereof, and wherein the first and second sets of user picks contain valid data, nulls, or a combination thereof.

16. The non-transitory storage medium of claim 15, wherein the delta value for the signal component is calculated according to the following equation:

$$\delta_i = \begin{cases} w_u(a_i - b_i) & \text{when neither } a_i \text{ nor } b_i \text{ is null} \\ w_u & \text{when exactly one of } a_i \text{ and } b_i \text{ are null,} \\ 0 & \text{when both } a_i \text{ and } b_i \text{ are null} \end{cases}$$

wherein $C_i$ denotes a first constant and $\lambda$ denotes a second constant.

17. A dynamic time warping system comprising:
a drilling system comprising logging and measurement elements communicatively coupled to a logging a facility having a system controller;
the system controller comprising a processor, a non-transitory memory, secondary storage and instructions executing in the non-transitory memory, the instructions configured to:
acquire a first sequence signal from at least one first logging tool lowered into a first borehole of a first well at a first speed and a second sequence signal from at least one second logging tool lowered into a second borehole of a second well at a second speed, the first sequence signal and the second sequence signal each being an ordered series having a shared ordering, wherein the first sequence signal comprises at least a first data point including a first set of components and a second data point including a second set of components, the first data point representing parameters at a first depth of the first well and the second data point representing parameters at a second depth of the first well, and wherein the second sequence signal comprises at least a third data point including a third set of components and a fourth data point including a fourth set of components, the third data point representing parameters at a first depth of the second well and the fourth data point representing parameters at a second depth of the second well;
acquire a first set of user picks and a second set of user picks, wherein the first set of user picks contains a first correspondence between the first data point and the third data point, and wherein the second set of user picks contains a second correspondence between the second data point and the fourth data point;
combine, by the processor, the first set of user picks and the second set of user picks with the first sequence signal and the second sequence signal to create at least a first modified hyper-complex signal and a second modified hyper-complex signal;
perform signal alignment on the first modified hyper-complex signal and the second modified hyper-complex signal to correlate well data between the first sequence signal and the second sequence signal, the signal alignment comprising aligning the ordered series of the first modified hyper-complex signal and the ordered series of the second modified hyper-complex signal along the shared ordering, performing the signal alignment further comprising calculating a distance between a point a and a point b according to the following equation:

$$\varepsilon_k(a, b) = \sqrt[k]{\sum_i |\delta_i|^k}$$

wherein $\varepsilon_k$ denotes the distance between data points a and b, wherein a denotes the first data point or the second data point and b denotes the third data point or the fourth data point, wherein k denotes a norm number, wherein i denotes a quantity of signal components in the first, second, third, and fourth sets of components, and wherein $\delta_i$ denotes a delta value for at least one of a signal component or a user pick,
and further wherein the delta value for the user pick is calculated according to the following equation:

$$\delta_i = \begin{cases} w_u(a_i - b_i) & \text{when neither } a_i \text{ nor } b_i \text{ is null} \\ w_u & \text{when exactly one of } a_i \text{ and } b_i \text{ are null} \\ 0 & \text{when both } a_i \text{ and } b_i \text{ are null} \end{cases}$$

wherein $w_u$ denotes a user weight, and wherein the user weight is selected according to a skill level of a user associated with the user pick; and
store, based on the signal alignment, at least a first modified and aligned hyper-complex signal and a second modified and aligned hyper-complex signal, wherein at least one of the first data point or the second data point in the first modified and aligned hyper-complex signal aligns with at least one of the third data point or the fourth data point in the second modified and aligned hyper-complex signal.

18. The system of claim 17, wherein performing the signal alignment comprises performing dynamic time warping (DTW) on the first modified hyper-complex signal and the second modified hyper-complex signal.

19. The system of claim 17, the instructions further configured to:
   generate a first well log and a second well log based on output signals of the at least one first logging tool and the at least one second logging tool; and
   wherein the first sequence signal and the second sequence signal are acquired from the first well log and the second well log, respectively.

20. The system of claim 17, wherein the components in one or more of the first, second, third, or fourth sets of components contain valid data, nulls, or a combination thereof, and wherein the first and second sets of user picks contain valid data, nulls, or a combination thereof.

\* \* \* \* \*